(12) United States Patent
Yano et al.

(10) Patent No.: US 6,474,768 B1
(45) Date of Patent: Nov. 5, 2002

(54) TEST PATTERN PRINTING METHOD, INFORMATION PROCESSING APPARATUS AND PRINTING APPARATUS

(75) Inventors: Kentaro Yano, Yokohama; Daigoro Kanematsu; Masao Kato, both of Kawasaki; Minako Kato; Mitsuhiro Ono, both of Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/551,768

(22) Filed: Apr. 18, 2000

(30) Foreign Application Priority Data

Apr. 19, 1999 (JP) .......................................... 11-111493

(51) Int. Cl.$^7$ ................................................. B41J 2/01
(52) U.S. Cl. ......................................... 347/19; 358/504
(58) Field of Search ............................... 347/15, 19, 43; 358/504

(56) References Cited

U.S. PATENT DOCUMENTS

| 5,111,310 A | | 5/1992 | Parker et al. ................ 358/456 |
| 5,898,443 A | * | 4/1999 | Yoshino et al. ................ 347/19 |
| 6,076,915 A | * | 6/2000 | Gast et al. ..................... 347/19 |

FOREIGN PATENT DOCUMENTS

JP   2661917   6/1997

OTHER PUBLICATIONS

Mitsa et al., "Digital Halftoning Technique Using a Blue–Noise Mask," J. Opt. Soc. Am. A, vol. 9, No. 11, Nov. 1992, pp. 1920–1929.

U.S. application Ser. No. 09/549,719, filed Apr. 14, 2000, pending.

U.S. application Ser. No. 09/551,875, filed Apr. 18, 2000, pending.

U.S. application Ser. No. 09/551,671, filed Apr. 18, 2000, pending.

U.S. application Ser. No. 09/551,769, filed Apr. 18, 2000, pending.

* cited by examiner

*Primary Examiner*—Craig A. Hallacher
(74) *Attorney, Agent, or Firm*—Fitzpatrick, Cella, Harper & Scinto

(57) ABSTRACT

In a correction processing that corrects a color deviation caused by output characteristic variations among print heads of a printing apparatus, the printing apparatus prints a test pattern that allows accurate detection of the color deviation by a visual check. More specifically, each of the patches in the test pattern is made up of two areas placed adjacent to each other. One of the two areas (upper area) is used as a test area for detecting the degree of the color deviation. Of the gradation values of C, M and Y, which make up the patch print data, the gradation values of C and M are changed among the patches making up the test pattern. The other area is used as a reference area printed with an achromatic color that represents a reference gradation value for the deviation detection. The gradation values of C, M, Y and K are determined so that a spatial frequency of dots formed in the reference area of each patch is close to the spatial frequency of the associated test area.

30 Claims, 9 Drawing Sheets

C INCREASES →

M INCREASES ↓

| C M Y K | 96 96 128 0 | 112 96 128 0 | 128 96 128 0 | 144 96 128 0 | 160 96 128 0 |
| C M Y K | 0 0 0 128 | 0 0 0 128 | 0 0 0 128 | 0 0 0 128 | 0 0 0 128 |

| | 96 112 128 0 | 112 112 128 0 | 128 112 128 0 | 144 112 128 0 | 160 112 128 0 |
| | 0 0 0 128 | 0 0 0 128 | 0 0 0 128 | 0 0 0 128 | 0 0 0 128 |

| | 96 128 128 0 | 112 128 128 0 | 128 128 128 0 | 144 128 128 0 | 160 128 128 0 |
| | 0 0 0 128 | 0 0 0 128 | 0 0 0 128 | 0 0 0 128 | 0 0 0 128 |

| | 96 144 128 0 | 112 144 128 0 | 128 144 128 0 | 144 144 128 0 | 160 144 128 0 |
| | 0 0 0 128 | 0 0 0 128 | 0 0 0 128 | 0 0 0 128 | 0 0 0 128 |

| | 96 160 128 0 | 112 160 128 0 | 128 160 128 0 | 144 160 128 0 | 160 160 128 0 |
| | 0 0 0 128 | 0 0 0 128 | 0 0 0 128 | 0 0 0 128 | 0 0 0 128 |

FIG. 1

C INCREASES →

M INCREASES ↓

|   | | | | | |
|---|---|---|---|---|---|
| C M Y K | 96 96 128 0 | 112 96 128 0 | 128 96 128 0 | 144 96 128 0 | 160 96 128 0 |
| C M Y K | 48 48 64 64 | 56 48 64 64 | 64 48 64 64 | 72 48 64 64 | 80 48 64 64 |

|  | 96 112 128 0 | 112 112 128 0 | 128 112 128 0 | 144 112 128 0 | 160 112 128 0 |
|---|---|---|---|---|---|
|  | 48 56 64 64 | 56 56 64 64 | 64 56 64 64 | 72 56 64 64 | 80 56 64 64 |

|  | 96 128 128 0 | 112 128 128 0 | 128 128 128 0 | 144 128 128 0 | 160 128 128 0 |
|---|---|---|---|---|---|
|  | 48 64 64 64 | 56 64 64 64 | 64 64 64 64 | 72 64 64 64 | 80 64 64 64 |

|  | 96 144 128 0 | 112 144 128 0 | 128 144 128 0 | 144 144 128 0 | 160 144 128 0 |
|---|---|---|---|---|---|
|  | 48 72 64 64 | 56 72 64 64 | 64 72 64 64 | 72 72 64 64 | 80 72 64 64 |

|  | 96 160 128 0 | 112 160 128 0 | 128 160 128 0 | 144 160 128 0 | 160 160 128 0 |
|---|---|---|---|---|---|
|  | 48 80 64 64 | 56 80 64 64 | 64 80 64 64 | 72 80 64 64 | 80 80 64 64 |

FIG. 9 ns filed Apr. 19, 1999, the content of which is incorporated hereinto by reference.

TEST PATTERN PRINTING METHOD, INFORMATION PROCESSING APPARATUS AND PRINTING APPARATUS

This application is based on Japanese Patent Application No. 11-111493 (1999) filed Apr. 19, 1999, the content of which is incorporated hereinto by reference.

BACKGROUND OF THE INVENTION

1. Field of the Invention

The present invention relates to a test pattern printing method, an information processing apparatus and a printing apparatus, and more specifically to a test pattern printing method for printing a test pattern which is checked to detect a color deviation, the deviation being caused by variations in an output characteristic among print heads, and an information processing apparatus and a printing apparatus for performing printing of the test pattern.

2. Description of the Related Art

As devices for automated office work have come into wide use, opportunities for producing color images in offices have increased. Known output devices for outputting color images include printing apparatuses of various methods, such as an ink jet method, an electro-photographic method and a heat transfer method. These printing apparatuses have been able to output picture-like color images of relatively high quality in recent years.

Such printing apparatuses generally print color images using three colorants of chromatic colors, cyan (C), magenta (M) and yellow (Y), or four colorants with an additional achromatic color, black (K). The printed color images, however, may have a color deviation or color misrepresentation (e.g., produced color in the printed image differs from a desired one) due to an imbalance of output characteristics (reflection density or lightness, saturation, hue, etc.) among print heads for respective colors. In the ink jet system, for example, the print heads may have, among themselves, differences in an amount of heat produced by heaters (film thickness of the heater) for ejecting ink and differences in a size and shape of ink ejection orifices, causing variations in an amount of ejected ink. This in turn may result in the output characteristic imbalance among the print heads for individual colors, as described above. Not only do the print heads inherently have such differences, but it is also known that these differences are produced over time.

To cope with this problem, a personal computer functioning as a host computer for the printing apparatus, or the printing apparatus itself, may perform correction processing which involves detecting the color deviation due to the differences among respective print heads and, based on the result of detection, correcting the output characteristics of the print heads to have predetermined characteristics. Known correction processings include methods to be carried out in two ways, which are distinguished depending primarily on whether the detection of the color deviation is done by using an input device such as a scanner or by a human visual check. These two correction methods, as distinguished by the manner of detecting the color deviation, will be briefly explained below.

The method using the input device such as a scanner, for example, firstly prints a patch pattern by using the print heads of C, M, Y and K coloring materials that are the subjects of the correction, as disclosed in the official gazette of Japanese Patent No. 2661917. Then, the patch pattern is read by the scanner to detect a difference between a read value (representing an output characteristic of the head) and an expected value calculated from the print data for the patch pattern. Based on the detected difference, the color deviation is corrected. The patch pattern used in this method may be a solid pattern of each of C, M, Y, K colors or a patch pattern of each color having patches showing a gradation in density. The gradation patch pattern can also be used to detect an output characteristic with respect to a halftone, thus improving precision of detecting the color deviation. A method is also known as that combines the C, M, Y and K colors to form second- or third-color patch patterns and thereby improves the detection and correction accuracy.

On the other hand, the method using the visual check, unlike the method using the input device, cannot easily detect an absolute value with respect to the output characteristic for each color head. Hence, a detection method that uses a third-color patch pattern printed by mixing three colorants C, M, Y is mostly used. More specifically, a plurality of patches of almost gray color is printed. The plurality of patches include a patch as a central patch of the plurality of patches, which is expected to be printed at a predetermined ratio of three colorants (represented by print data of three colorants) so as to be a patch of an achromatic color when the patch is printed by using print heads with an average ink ejection amount or without any deviation of ink ejection amount, and other patches which are printed with their three-color ratios successively changed slightly. From the plurality of patches, a user visually chooses one patch closest to the achromatic color so as to detect the patch of the most appropriate output characteristic balance among the C, M, Y color print heads. Then, the correction data corresponding to the detected patch is used to correct the output characteristic of each print head. This method of detecting the color deviation takes advantage of a fact that a slight imbalance in the output characteristics among the C, M, Y color print heads causes influence of the color having relatively large output characteristic change to appear in the patch, resulting in the patch deviating from the achromatic color.

While the color deviation and the method of its detection have been described for the case of the print heads of the ink jet system, differences in the output characteristics of the color print heads may also occur with the printing apparatuses of the electrophotographic system and the heat transfer system due to causes peculiar to the principles of the respective printing systems. In these printing systems, also, the color deviation detection and correction are performed in a similar manner.

The conventional color deviation detection method described above, however, has the following drawbacks.

First, in a usual environment in which the printing apparatus is used, the method using an input device such as a scanner requires a condition that the user has an input device. Not all users have an input device available and thus the method using the scanner or other input devices is not realistic. If some input devices are made available, the correction process on a basis of the color deviation detection using such wide variation of input devices is often very difficult to be carried out.

The method based on the visual check, on the other hand, does not require any special input device and thus can be employed by any user to detect the color deviation. It is, however, not so easy to select a patch closest to an achromatic color from a plurality of patches with their C, M, Y color ratios progressively changed slightly.

For example, JIS (JIS E3305, JIS Z8721, JIS L0600, etc.) and various other organizations provide specifications concerning a color difference (ΔE). In these specifications, a range of the color difference of 3.2–6.5 is defined as a "range that can be handled as the same color in terms of impression." This suggests that visually picking up a patch closest to the achromatic color from patches in this range of color difference is difficult. It is also stated that the color difference in such a range may "cause a customer to complain about difference in color when selecting paint color," suggesting that even in this range of color difference, if a wrong patch is selected, an image printed after being corrected by a correction value corresponding to the selected patch may fail to provide a desired color.

For this reason, an effort is being made to improve an accuracy of the visual check-based color deviation detection method.

FIG. 1 is a view schematically showing an example of a test pattern that enables an improvement of precision for detecting the color deviation. In FIG. 1, each frame represents a patch printed with a mixture of C, M and Y colors and with K. Four numbers in each of two areas in each patch represent multi-valued gradation data for printing the associated area and correspond, from top to bottom, to C, M, Y and K. Thus, the patch shown in FIG. 1 consists of two upper and lower areas. The test pattern is made up of an array of such patches with their gradation values of M increasing vertically downward in five steps and that of C increasing horizontally toward the right in five steps.

As is apparent from FIG. 1, a test area defined by the upper area in each patch is an area printed with a mixture of C, M, Y colorants of chromatic colors (the mixed color is hereinafter referred to as "PCBk" that is "process black"). A reference area defined by the lower area is an area printed with only K, a colorant of achromatic color. In the upper area printed with PCBk the gradation value of Y is fixed at a 128 level. Further, as described above, value of C in the pattern increases toward the right and value of M increases downwardly.

With the test pattern constructed in this way, the precision of visual detection can be improved. More specifically, this pattern takes advantage of a visual characteristic that when objects are close together, a small color difference can be perceived. More concretely, this pattern is based on a fact that even if the color difference is as small as 0.8–1.6, a comparison between adjacent objects allows a human eye to perceive the color difference. The pattern of this method allows the user, rather than to search, without any criterion, through a plurality of patches printed with only PCBk to find a patch closest to the achromatic color, to make a one-to-one comparison between an area printed with an achromatic color K and an area printed with PCBk, which areas are adjacent to each other, and thereby select a patch with a PCBk area having the least color difference from the area of achromatic color K. Thus, the precision of visual detection can be improved. This method is hereinafter called an "adjacency comparison method".

As described above, the precision of visual detection of color difference (color deviation) can generally be improved by using the adjacency comparison method. However, when it is attempted to make a further improvement in the detection precision, particularly in the two-value or binary value printing, the conventional adjacency comparison method may prove insufficient. This problem will be explained in detail as follows.

The test area of PCBk in the conventional patch is generally printed not by what is called a solid printing in which dots of each colorant are formed on all pixels, but by half-tone printing using an intermediate gradation value of each colorant. The half-tone printing is used for the following reason. Considering that there are errors in the positions of the dots formed and that the dots are circular in actual printing, a printing system is designed to overlap the formed dots to ensure that during the solid printing the paper surface is filled with dots so that no blank areas are left unprinted. That is, because the printing system is designed as described above, when a printing duty is near 100%, a rate of covering the paper surface with the dots is about 100% to hardly change, which in turn does not allow the variation in a size of the formed dot and a position of the formed dot due to a change of the output characteristic to be detected as a significant change. Therefore, the PCBk area is not solid-printed for each colorant dot, but is often printed with gradation data that corresponds to an intermediate value of the printing duty. More specifically, of 256 gradation values represented as data of 8 bits, the data close to a value of 128 is used for printing the PCBk area. As for an adjacent area printed with the K colorant, it is desired that a difference in lightness of the adjacent area from the above-described PCBk area is not so large. Thus, the data near the gradation value of 128 is also often employed in this case.

With this conventional patch, however, when the test area printed with chromatic colorants at the gradation value of 128 and a reference area printed with only K colorant at the gradation value of 128 are compared, there is a relatively great difference in a dot spatial frequency (dot density) between the areas, particularly in the case of printing the patch with a printing apparatus of the binary printing system. As a result of this, respective characteristics of visual perception for the two areas under comparison differ greatly, rendering proper detection of the color deviation by the visual check impossible.

In the test area, even though the C, M, Y colors each have the gradation value of 128, the total number of dots formed per unit area is roughly three times the number of dots in the reference area printed with only K at the gradation value of 128. On the other hand, in order to make the spatial frequency of the test area almost equal to that of the reference area, the number of dots of each C, M, Y color may be set to be equal to one-third the number of dots in the reference area, i.e., the gradation value of each color is set to about 42. In this case, however, a large difference in the lightness is generated between the two areas, rendering the patch inappropriate for comparison.

That is, for the printing apparatus of the binary printing system, attempting to match the lightness of the PCBk test area and the lightness of the K reference area results in a large difference in the spatial frequency. Attempting to match the spatial frequencies of these two areas causes a large difference in the lightness. In either case, the patches are not appropriate for the adjacency comparison method.

SUMMARY OF THE INVENTION

The present invention provides a test pattern printing method, an information processing apparatus and a printing apparatus which are capable of printing test patterns that allow visual detection of a color deviation with high precision in a process of correcting the color deviation resulting from variations of output characteristics among printing apparatuses.

In the first aspect of the present invention, there is provided a test pattern printing method of printing a test pattern used in correction processing, the correction processing making an output characteristic for each of a plurality of colorants a predetermined one to correct a color deviation, the method comprising the step of:

printing a plurality of patches, each of which has a test area and a reference area placed adjacent to each other, the test area being printed with a mixture of the plurality of colorants and serving as an indicator for indicating a degree of the color deviation and the reference area being printed with an achromatic color and serving as a reference to be compared with the test area, the plurality of patches being formed with dots of the plurality of colorants to be printed at different mixing ratios of the plurality of colorants, respectively;

wherein the test area and the reference area are printed so that their spatial frequencies of the dots are close to each other.

In the second aspect of the present invention, there is provided an information processing apparatus for performing a process for printing a test pattern used in correction processing, the correction processing making an output characteristic for each of a plurality of colorants a predetermined one to correct a color deviation in printing by a printing apparatus, the apparatus comprising:

means for supplying printing data to cause the printing apparatus to print a plurality of patches, each of which has a test area and a reference area placed adjacent to each other, the test area being printed with a mixture of the plurality of colorants and serving as an indicator for indicating a degree of the color deviation and the reference area being printed with an achromatic color and serving as a reference to be compared with the test area, the plurality of patches being formed with dots of the plurality of colorants to be printed at different mixing ratios of the plurality of colorants, respectively;

wherein the test area and the reference area are printed so that their spatial frequencies of the dots are close to each other.

In the third aspect of the present invention, there is provided a printing apparatus capable of printing a test pattern used in correction processing, the correction processing making an output characteristic for each of a plurality of colorants a predetermined one to correct a color deviation, the apparatus comprising:

means for printing a plurality of patches, each of which has a test area and a reference area placed adjacent to each other, the test area being printed with a mixture of the plurality of colorants and serving as an indicator for indicating a degree of the color deviation and the reference area being printed with an achromatic color and serving as a reference to be compared with the test area, the plurality of patches being formed with dots of the plurality of colorants to be printed at different mixing ratios of the plurality of colorants, respectively;

wherein the test area and the reference area are printed so that their spatial frequencies of the dots are close to each other.

According to the above configuration, the test pattern, which is used to be checked for making the output characteristic for each of a plurality of colorants a predetermined one so as to correct color deviations, is printed. The test pattern comprises a plurality of patches, each of which has a test area and a reference area close together. The test area is printed with a mixture of a plurality of colorants and serves as an indicator for indicating a degree of the color deviation, and the reference area is printed with an achromatic color and serves as a reference to be compared with the test area. Among the plurality of patches, the mixing ratio of the colorants is changed from one patch to another. The spatial frequencies of the dots in the test area and in the reference area are set close to each other. Therefore, the visual perception characteristics for both areas, when the user views the patch, can be made almost equal. This, in turn, allows the user to perceive the actual colors of the two areas more precisely, making it possible to compare with good accuracy the color of the test area with that of the reference area. As a result, the user can easily discern a patch having the color of the test area closest to the color of the reference area.

The above and other objects, effects, features and advantages of the present invention will become more apparent from the following description of embodiments thereof taken in conjunction with the accompanying drawings.

BRIEF DESCRIPTION OF THE DRAWINGS

FIG. 1 is a diagram showing a conventional test pattern used for detecting a color deviation;

FIG. 9 is a diagram showing a test pattern used for detecting the color deviation according to another embodiment of the present invention.

DESCRIPTION OF THE PREFERRED EMBODIMENTS

By referring to the accompanying drawings, embodiments of the present invention will be described in detail.

<Summary>

The method of detecting the C, M, Y output characteristics of the ink jet printing apparatus, according to the following embodiments of the present invention, involves printing a test pattern made up of an array of patches whose balance (a printing duty (a printing rate) or a gradation value data) among C, M, Y colors varies progressively from one patch to another, and then selecting by the adjacency comparison method a patch having a test area whose color is the closest to the achromatic color of a reference area. In the embodiments, the reference area is printed with a mixture of chromatic C, M, Y color inks in addition to a K ink. Further, the printing duty of each C, M, Y ink for the reference area is set almost equal to the printing duty of each C, M, Y ink for the test area of the patch. This reduces a difference in the spatial frequency between the test area and the reference area in each patch and improves precision with which to identify the achromatic color.

A correcting process of correcting an output characteristic deviation thus detected for the print head of each color involves selecting, from among a plurality of output γ correction tables prepared in advance, an output γ correction table corresponding to the selected patch, and rewriting the output γ correction table used for image processing with the selected one.

[First Embodiment]

Figure 2:
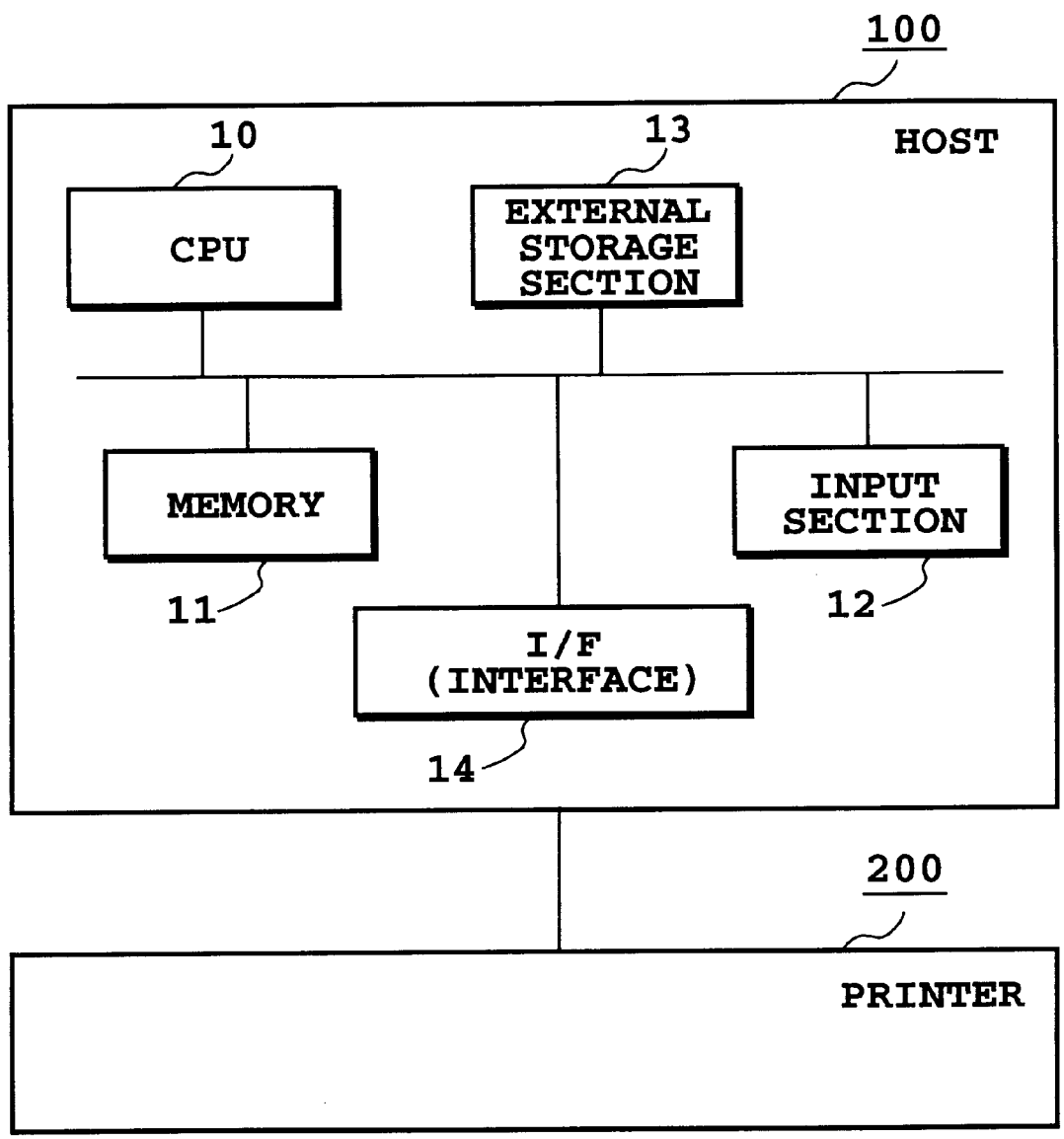
FIG. 2 is a block diagram showing an image processing system as one embodiment of the present invention.

FIG. 2 is a block diagram showing a configuration of the image processing system according to a first embodiment of the present invention.

In the figure, a host 100 as an information processing apparatus is realized by a personal computer, for example, and includes a CPU 10, a memory 11, an external storage section 13, an input section 12 such as keyboard, and an interface for communication with a printer 200. The CPU 10, according to programs loaded in the memory 11, executes a variety of processings, which include, in particular, image processing, such as color processing and quantization processing described later, and correction processing for an output characteristic pertinent to this embodiment. These programs are stored in the external storage section 13 or loaded from external devices. The host 100 is connected to the printer 200 as a printing apparatus through the interface and supplies print data that has undergone the image processing to the printer 200 for printing.

<Configuration of the Printer>

Figure 3:
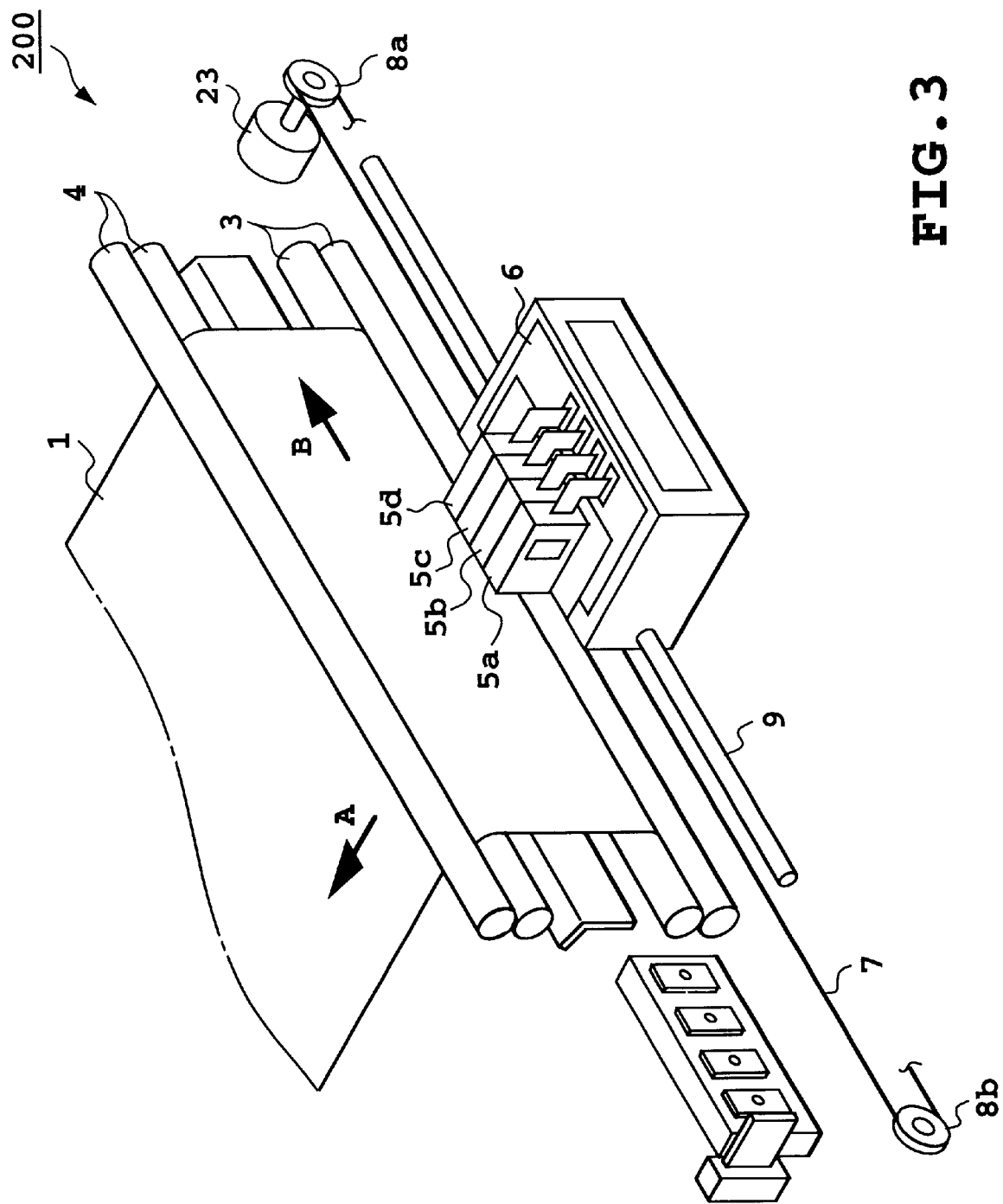
FIG. 3 is a perspective view showing mechanisms of an essential part of an ink jet printer in the image processing system.

FIG. 3 is a perspective view schematically showing a mechanical construction of the printer 200.

In FIG. 3, reference number 1 designates a recording sheet such as a paper or plastic sheet. A plurality of such sheets is stacked in a cassette and, during a printing operation, the sheets are separated to be supplied one sheet at a time by means of feed rollers (not shown). The supplied sheet is then, by a first feed roller pair 3 and a second feed roller pair 4, fed a predetermined distance in the direction of arrow A in the figure for each timing corresponding to scanning of a print head. Both roller pairs are arranged a predetermined interval apart and are driven by associated stepping motors (not shown).

Designated by 5a, 5b, 5c and 5d are print heads of an ink jet system that eject ink onto the recording sheet 1 for printing, respectively. The ink for each print head is supplied from a corresponding ink cartridge not shown. The respective print heads are driven in response to ink ejection signals to eject inks of respective cyan(C), magenta(M), yellow(Y), and black(K) colors from their ejection openings. To describe in more detail, in an ink path corresponding to each ejection opening of the print head is provided an electrothermal transducer, which generates thermal energy to form a bubble in the ink to eject the ink by the pressure of the bubble. The print heads 5a, 5b, 5c and 5d and the ink cartridge are mounted on a carriage 6. The carriage 6 is driven with a driving force from a carriage motor 23 transmitted through a belt 7 and pulleys 8a, 8b so as to move reciprocally along a guide shaft 9 to perform the scanning of the print head.

In the above construction, the print heads 5a, 5b, 5c and 5d, while being scanned in the direction of arrow B in the figure, eject respective inks onto the recording sheet 1 in response to the ink ejection signals to form ink dots on the recording sheet 1, thus performing printing. The print heads 5a, 5b, 5c and 5d move to a home position, as required, and are subjected to an ink ejection recovery operation by an ejection recovery unit 2 to prevent or eliminate clogging of the ejection openings. Further, in synchronism with the scanning of the print heads 5a, 5b, 5c and 5d, the feed roller pairs 3, 4 are driven to feed the recording sheet 1 at a distance corresponding to one line of the scanning of the print head, in the direction of arrow A. By repeating this operation an image can be printed on the recording sheet 1.

Figure 4:
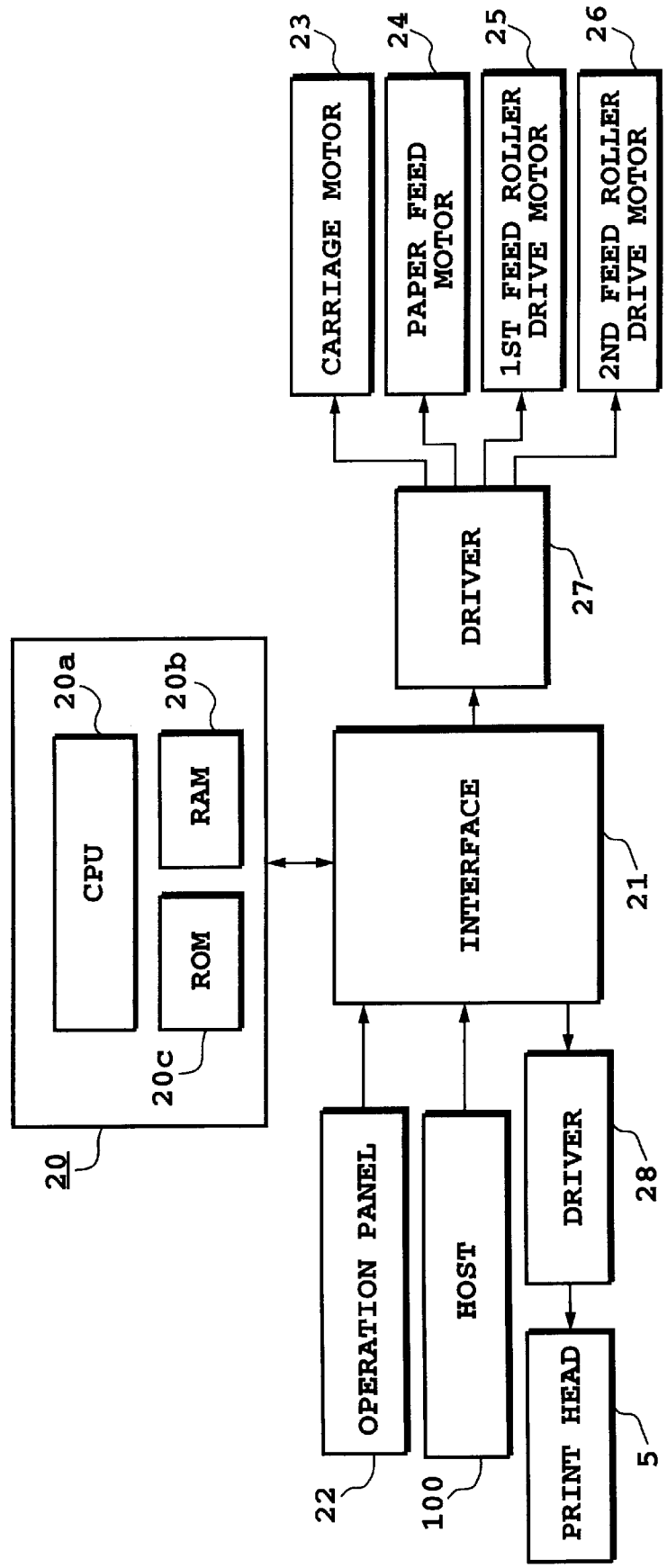
FIG. 4 is a block diagram showing a control configuration of the printer.

FIG. 4 is a block diagram showing a control configuration of the printer.

The control system, as shown in FIG. 4, has a control section 20, which includes a CPU 20a such as a microprocessor, a ROM 20b storing control programs and various data for the CPU 20a and a RAM 20c used as a work area for the CPU 20a and temporarily storing various data such as print data; an interface 21; an operation panel 22; a driver 27 for driving a variety of motors (carriage drive motor 23, paper feed roller drive motor 24, first feed roller pair drive motor 25, and second feed roller pair drive motor 26); and a driver 28 for driving the print head 5.

In the above configuration, the control section 20 outputs and inputs data such as print data to and from the host 100 through the interface 21, and inputs a variety of information (such as character pitch, character kind, etc.) from the operation panel 22. Further, the control unit 20 outputs ON/OFF signals through the interface 21 to drive each of the motors 23–26 and also an ink ejection signal to the driver 28 to control the ink ejection operation of the print head.

<Image Processing>

Next, image processing performed when the host 100 generates print data to be used in the printer will be described.

Figure 5:
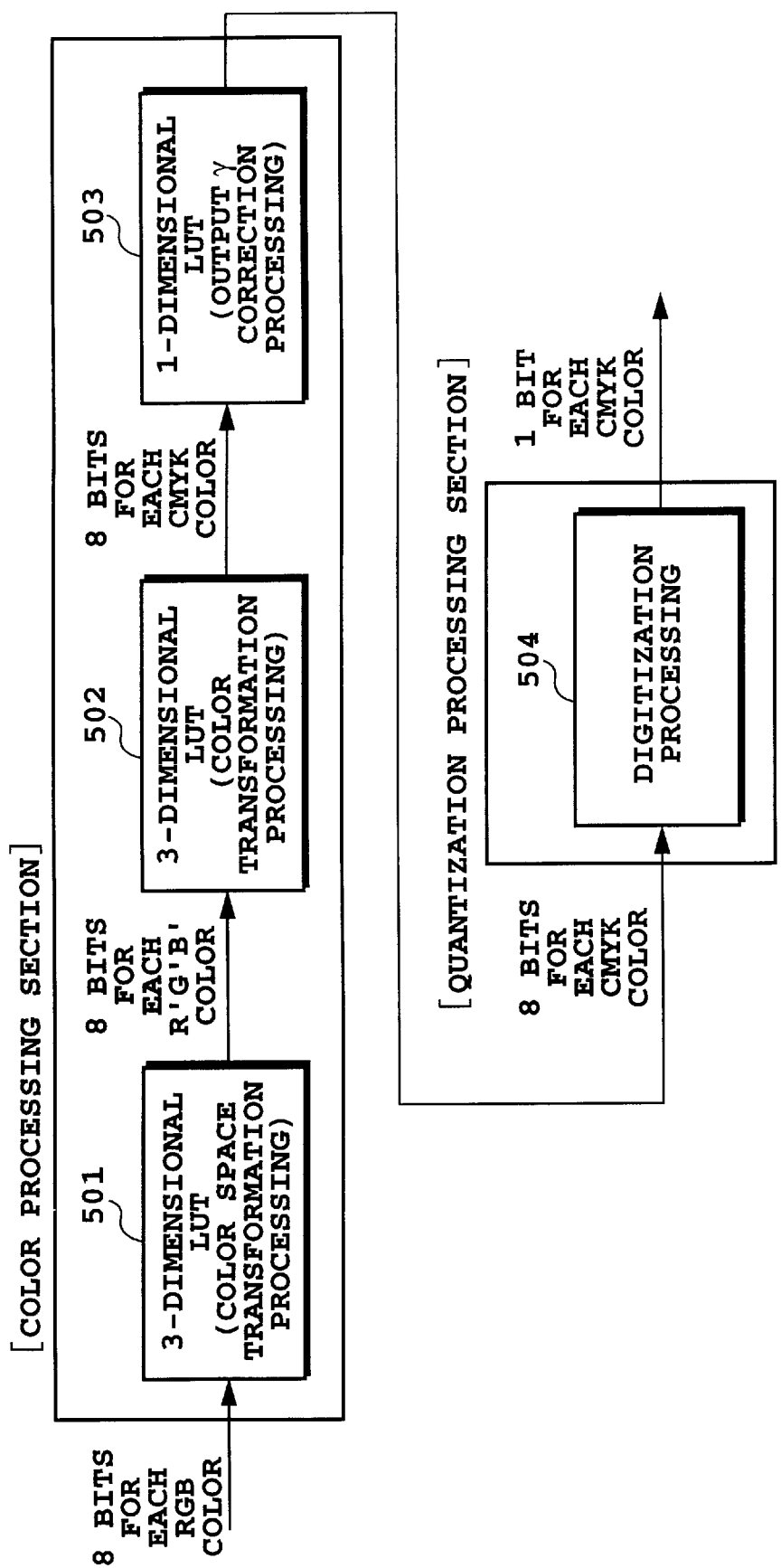
FIG. 5 is a block diagram showing an operation sequence of the image processing performed in the printer.

FIG. 5 is a block diagram showing a configuration for the image processing, by which input 8-bit image data (with 256 gradation values) for each red (R), green (G) and blue (B) color is eventually output as 1-bit image data for each color of cyan (C), magenta (M), yellow (Y), and black (K).

As shown in FIG. 5, 8-bit luminance data for each R, G, B color is first converted into 8-bit data for each R', G', B' color by using a three-dimensional lookup table (LUT) 501. The processing of converting the R, G, B data into the R', G'. B' data is called first-stage color processing in which a color space transformation is performed to correct a difference between the color space of the input image represented by the R, G, B luminance data and the color space reproducible by the printer 200. The 8-bit data for each R', G', B' color that has undergone the first-stage color processing is then converted into 8-bit data for each C, M, Y, K color by processing that uses a three-dimensional LUT 502 of the next stage. This color transformation processing is called second-stage color processing in which RGB data of an input system represented by a luminance signal is converted into CMYK data of an output system represented by density signals. The later color processing is provided for the following reason. The input data is usually generated as data of an additive mixing (process) of three primary colors (RGB) with respect to an illuminating element such as a display and the printer on the other hand uses a subtractive mixing of three primary colors (CMY) which represents colors by the reflection of light.

Table data contained in the three-dimensional LUTs used in the first- and second-stage color processing does not cover all combinations of 8-bit data for each color because of a limit on a memory capacity, but is provided for only points having a predetermined spatial distance therebetween among all points represented by the above combination in the three-dimensional space. Hence, for points other than those lying at the predetermined distance, the transformation of the 8-bit data is done by using an interpolation. The interpolation is a known technique and, therefore, its explanation is omitted here.

The 8-bit data for each C, M, Y, K color that has undergone the second-stage processing is subjected to an output γ correction by means of a one-dimensional LUT 503 for each color. This processing is performed for a reason that a number of dots printed in a unit area of a recording medium and an output characteristic such as reflection density obtained by measuring the printed dots usually do not have a linear relation with each other. Therefore, performing the output γ correction can realize a linear relationship between the 8-bit input gradation level of each C, M, Y. K color and the density level of the printed image.

Generally, the output γ correction table prepared for a print head that performs an average output characteristic is often used. However, the print heads generally have or produce among themselves output characteristic variations and thus an optimum value of the γ correction parameter varies from one print head to another. For this reason, this embodiment, as described later, obtains information on a color deviation and, based on this information, performs a correction that allows the output γ correction table to be updated. For example, when the output characteristic of the print head for the cyan (C) colorant exceeds an expected value, the one-dimensional LUT associated with the γ correction of C is modified so that the table produces a slightly lower-than-expected output value for any input value. Whereby, the γ correction performed after the modification of the table ensures that the gradation in a printed image is reproduced in conformity with the expected gradations, even when a print head that outputs the C colorant relatively strongly is used.

After the output γ correction described above, digitization processing 504 is performed. The printer 200 of this embodiment is one of a binary printing system and thus the 8-bit data for each C, M, Y, K color is quantized into 1-bit data for each C, M, Y, K color. Then, these binary data are sent to the printer 200 as print data for respective print heads 5a, 5b, 5c, and 5d.

This embodiment uses an error diffusion method as a digitization technique so as to allow the printer 200 of the binary printing system to realize a picture-like half-tone image showing smooth gradation change. The quantization using the error diffusion method is known in the art and, therefore, its explanation is omitted here.

<Color Deviation Detection Method and Correction Method>

Next, a color deviation detection method and a correction method based on detected color deviation information according to this embodiment will be explained.

Figure 6:
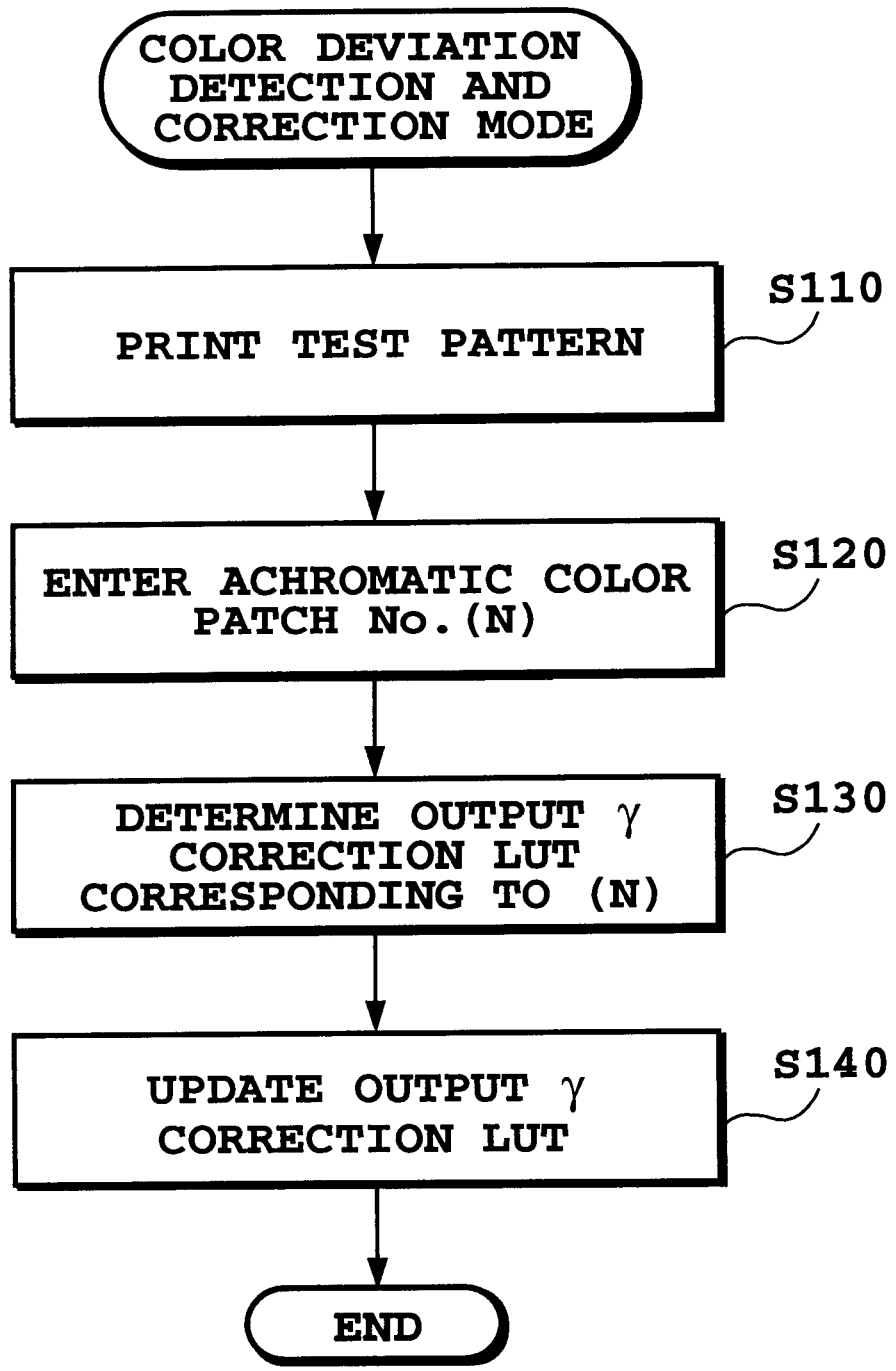
FIG. 6 is a flow chart showing a detection sequence of color deviation and of a correction sequence of the color deviation, according to an embodiment of the present invention.

FIG. 6 is a flow chart showing processing executed in the host 100, the processing including processing for detecting a color deviation and performing correction based on the color deviation information.

The processing is started by a user selecting this detecting and correcting mode on a UI (user interface) picture displayed by a printer driver operating on the host 100. First, at step S110 the printer 200, which is an object to be corrected, is commanded to print a detection pattern used for detecting the color deviation. More specifically, the printer driver performs the above described image processing on detection pattern data shown in FIG. 7, which is previously set and used for detecting information of individual differences in printing characteristics, and converts the pattern data, which has undergone the image processing, into bit image data. Then, the printer driver transfers print data of the detection pattern represented by the bit image data through the interface 14 (see FIG. 2) to the printer 200. When printing the detection pattern, the LUT for the output γ correction, which is used in the image processing, is one set to a default which has a linear input/output transformation relation and which outputs the input value as is.

Figure 7:
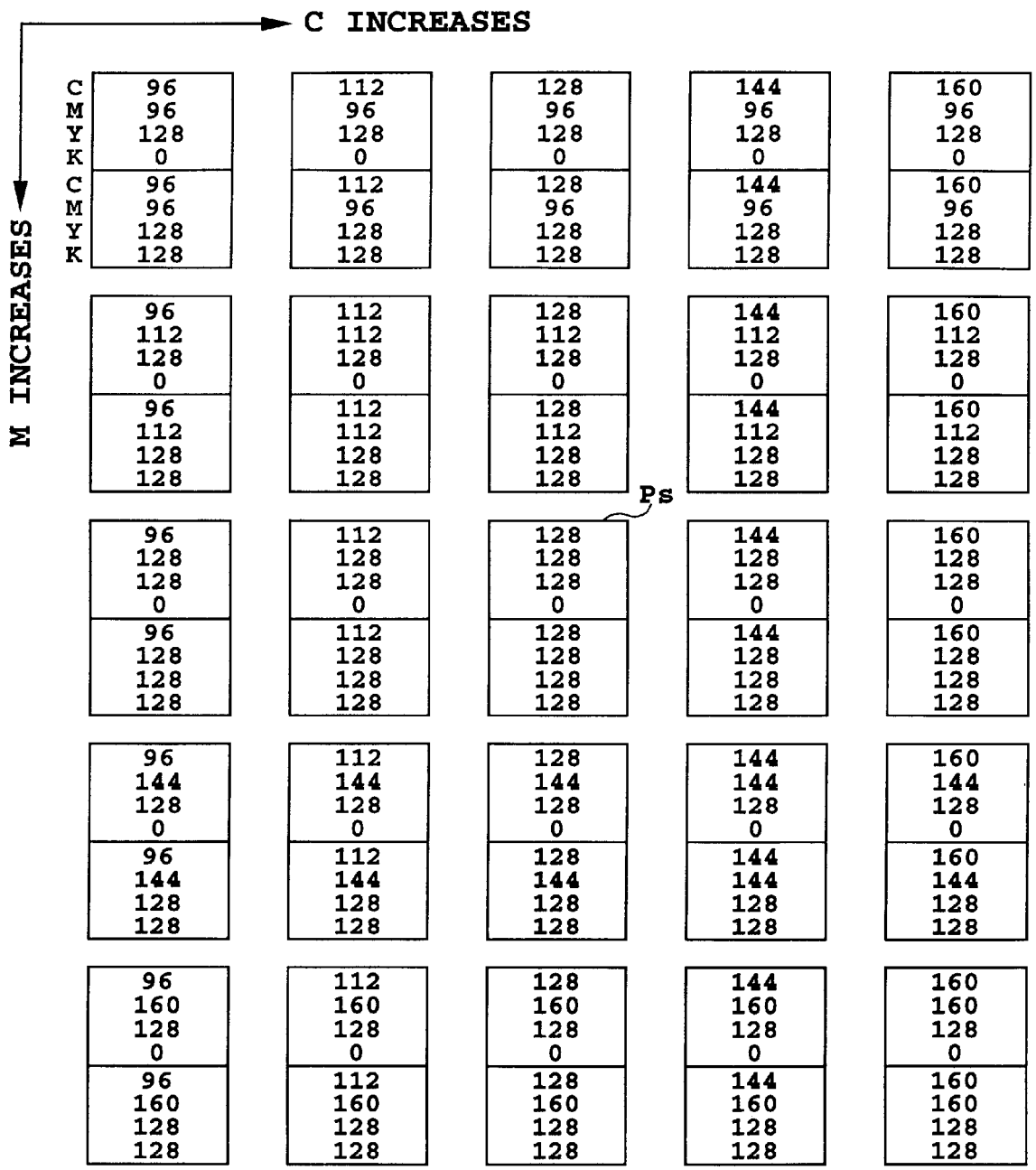
FIG. 7 is a diagram showing a test pattern used for detecting the color deviation according to an embodiment of the present invention.

A detail of the detection pattern data is shown in FIG. 7. In FIG. 7, each frame represents a patch to be printed with C, M, Y, K colors at a unique mixture ratio. The respective four numbers in upper and lower areas of each frame represent, from top to bottom, a gradation value or print data value of C, M, Y and K. These upper and lower areas make up one patch. A test pattern is made up of a matrix of such patches with their gradation values of M increasing vertically downward in five steps and that of C increasing horizontally toward the right in five steps. The upper area in each patch represents a "test area" used as an object of visual comparison by a user, which is printed with a mixture (PCBk) of C, M, Y, K colorants. The lower area is an achromatic "reference area" serving as a reference for the comparison and printed with a mixture of K colorant and C, M, Y colorants. The gradation value of each color shown in each patch is a print data for printing the respective area of the patch and substantially corresponds to a printing duty (a printing rate) of each C, M, Y colorant.

In this embodiment, the printing duty of each C, M, Y colorant in the reference area is set equal to the printing duty of each C, M, Y colorant in the test area of that patch. This can make a difference in a spatial frequency between the test area and the reference area small in comparison with a conventional patch, thus making perception characteristics for both areas close to each other. As a result, a disturbance that affects a user's visual selecting of a patch having the test area closest to the achromatic color of the reference area can be reduced, improving the precision of detecting the color deviation.

Figure 8:
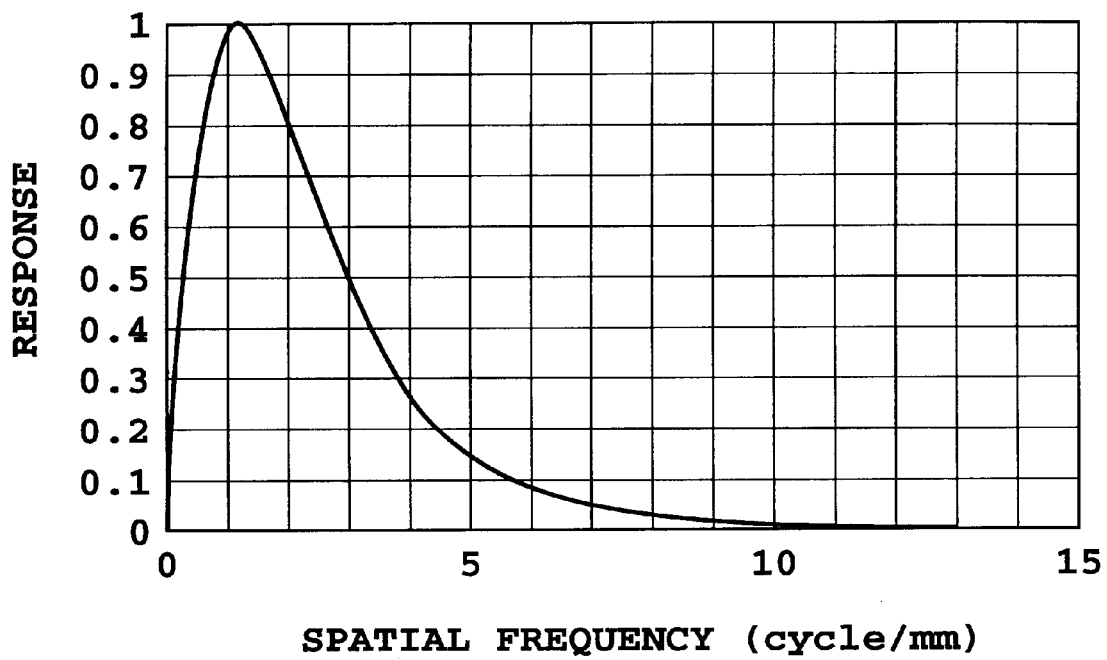
FIG. 8 is a graph showing a human vision characteristic versus a spatial frequency of dots formed in a printed image.

FIG. 8 is a graph for explaining an effect of the spatial frequency on the perception characteristic. It shows a relation between a capability of vision to reproduce an image and the spatial frequency of the image (MTF or modulation transfer function), approximated by a Dooley equation.

As is seen from FIG. 8, a response performance of the human visual perceptive function in recognizing a binary value image, which is formed by presence of dot or not, depends largely on the spatial frequency of that image. As described above, putting the test area and the reference area adjacent to each other when detecting their color difference can be expected to make a certain level of contribution to improving the detection accuracy. When the spatial frequencies of the two areas differ greatly, however, the response performance in perceiving each area differs greatly, which may result in a situation where in every combination of the test area and the reference area the colors of these two areas are equally not close to each other (i.e., it is impossible to determine which combination (patch) provides the closest match in color between the test area and the reference area). Hence, this embodiment ensures that the test area and the reference area in each patch do not have significantly different spatial frequencies and thereby enables the user to accurately select a patch having the closest match in color between the test area and the reference area, i.e., a patch with the test area having the color closest to achromatic color.

After the test pattern has been printed (at step S110) and a patch with the test area having the color closest to the achromatic color (in the reference area of each patch) has been selected by the user's visual check, at step S120 shown in FIG. 6 input processing for the selected patch number is performed. That is, the patch number entered by the user through the UI picture is stored in a predetermined memory location.

The test pattern of this embodiment is constructed in such a manner that, if the print heads ejecting respective color inks have, for example, no ink ejection amount deviation, the center patch Ps (C=M=Y=128) in FIG. 7 is selected as a patch having a test area whose color is the closest to the achromatic color. In other words, the output γ correction LUT for each color, which is used when printing the test pattern and is set to default, is an LUT that is set under a condition that the print heads mounted have output characteristics (ink ejection amount) that makes the test area in the patch Ps closest to the achromatic color, i.e., a condition that the realized density balance among the colors is optimum.

In the case that a patch other than the patch Ps in the test pattern of FIG. 7 should be selected as having the test area closest to the achromatic color, the printing apparatus that has printed the test pattern is understood to have an output characteristic imbalance among the C, M, Y print heads (i.e., a color deviation). In this embodiment, 25 selectable patches are provided as shown in FIG. 7, and to what degree the balance of the output characteristics among the print heads of respective colors is deviated can be determined by selecting a patch whose test area is closest to the achromatic color. In accordance with this configuration, this embodiment provides in advance 25 one-dimensional LUTs (output γ correction tables) to perform the γ correction to make the output characteristic balance optimum according to which patch has been selected.

Therefore, at step S130 shown in FIG. 6, the output γ correction LUT to be used for the image processing is chosen from among the 25 output γ correction LUTs according to the patch number entered at step S120 and then, at step S140, the output γ correction table is updated by the chosen table. With the above processing, the detection of the color deviation and the updating of the γ correction table (correction of the γ correction table) are completed.

The manner of updating the output γ correction table is not limited to that of selecting the table as described above. A relation between input and output of the table may be modified by changing address information for the table. Alternatively, in a system where an active output γ correction table is copied into a predetermined memory area and is used for the image processing, a newly selected output γ correction table may be copied into this area to update the output γ correction table. In any case, it is obvious that the present invention is not limited by the way the output γ correction table is updated.

As can be seen from the above, this embodiment has, strictly speaking, a greater number of dots formed in unit areas of the reference area in each patch than in unit areas of the test area. It is, therefore, a preferable option to reduce the gradation level of K and the gradation levels of C, M and Y in the reference area to make the spatial frequencies of the two areas closer together.

FIG. 9 shows one such example, in which the gradation values of C, M, Y and K in the reference area are each reduced to one-half in comparison with the test pattern shown in FIG. 7. With this pattern, the spatial frequency of the reference area can be made closer to that of the test area, allowing more appropriate adjacent comparison.

In making the spatial frequencies close together, the relative ratio among C, M and Y should be preferably kept from changing significantly. This is due to the following reason. When the chromatic colors C, M, Y are printed at the same printing duties in the test area and the reference area, as in the embodiment shown in FIG. 7, the test area may look bluish, for example, depending on the printing duty of the chromatic colors C, M, Y. This, however, does not pose so serious a problem because, in the reference area, too, a color which looks bluish to the same degree appears along with the achromatic color K. That is, if the test area is somewhat bluish, selecting a patch whose test area color is closest to the reference area color results in the selection of a patch with the test area closest to the achromatic color. When, on the other hand, the reference area is printed with the chromatic colors C, M, Y along with K at a printing duty different from that at which these chromatic colors are printed in the test area, the selection of a patch whose test area color is closest to the reference area color does not necessarily pick the patch having the test area closest to the achromatic color.

To what extent the difference in the printing duty balance of chromatic colors between the test area and the reference area can be tolerated varies depending on many factors including a physical property of colorants such as inks and a resolution of the test pattern. Therefore, although the above-mentioned printing duty balance is among the design items for each product, it is not recommended to use two sets of chromatic colors with greatly differing printing duty balances for the purpose of only matching the spatial frequencies of the two areas.

Further, when the printing duty exceeds 100%, the covering rate of the recording medium with dots reaches almost 100%, and thus a problem of the visual response performance related to the spatial frequency is alleviated. Hence, by setting the printing duties in the test area and the reference area to 100% or more, the detection precision may be improved. When the covering rate is almost 100%, it is feared that the patch-to-patch color deviations themselves may decrease, as described before. However, if the patches are designed so that the 100% covering rate is realized with the dots of different colors, a change in the dot size (output characteristic) of one of the colors results in the color deviation showing up relatively conspicuously, allowing the user to detect the color deviation easily. In addition, it should be noted that, also in the case that the covering rate is more than 70%, substantially the same effect in the detection precision as the case of the 100% covering rate can be obtained.

Furthermore, in this embodiment, the test pattern data shown in FIG. 7 is stored as 8-bit information for each C, M, Y and K color and thus the multi-value data is transformed by the one-dimensional LUT of default setting (i.e., subjected to the output γ correction processing). Then, the multi-value data is digitized so as to be outputted as the print information to the printing apparatus. It is also possible to directly digitize the multi-value data without subjecting it to the conversion processing based on the one-dimensional LUT. Further, apart from the aforementioned image processing routine that performs the image processing during the ordinary printing, it is also possible to provide a separate routine that converts the test pattern data into 1-bit print data for each C, M, Y and K color.

With the correction for the output characteristics in the print heads according to this embodiment described above, the color deviation caused by the output characteristic imbalance among color print heads can be detected with high precision without using a special measuring device. That is, in the adjacency comparison method, the spatial frequencies of dots formed in the test area and the reference area are set close to each other to make the perception characteristics for these areas almost equal, which in turn makes the comparison between the two areas more accurate.

[Second Embodiment]

In the above embodiment, no particular definitions are made regarding positions of dots in the reference area of the patch where the respective dots of the chromatic colors C, M, Y and the achromatic color K are formed. In this case, the chromatic colors and the achromatic color overlap randomly. At some probability, one of the C, M and Y dots and the K dot may overlap concentratedly at a certain probability. In that case, because the K dot is of a pure black ink color, any chromatic color overlapping with the K dot loses its color. As a result, when, for example, a frequency of overlapping between the C dot and the K dot is higher than the overlapping frequencies between M and Y dots and the K dot, the reference area looks reddish regardless of the output characteristic of each print head, rendering the accurate color deviation detection impossible.

For this reason, this embodiment produces a test pattern that is made by considering the overlapping of dots of chromatic color and achromatic color.

For the digitization processing, this embodiment employs a dithering method rather than the error diffusion method used in the first embodiment, particularly a blue noise dithering method in which the spatial frequency characteristic of the output image exhibits a blue noise characteristic. A reason that the dithering method is used for the digitization processing is that the dithering method generally can uniquely determine the dot arrangement and, through the dithering method (dither pattern), the dot formation position can be controlled.

In this embodiment, the dither patterns for C, M and Y use the same one as a blue noise dither mask pattern. A mask pattern for K uses one having a threshold value of [K mask pattern's threshold value]=[255]−[C, M, Y mask patterns' threshold values]. The use of such mask patterns increases a frequency at which the K dot appears on a pixel on which C, M and Y dots are unlikely to appear, so that in at least a range not exceeding the gradation level of 128, the C, M, Y chromatic color dots and the K achromatic color dots do not overlap. This reduces a deviation toward a particular color in the reference area, which deviation is caused by a particular chromatic color dot frequently overlapping the K dots. Further, because the blue noise dithering method is used for the digitization processing, it is possible to keep a smooth gradation change the same as an output image by the error-diffusion method with its low frequency component cut off.

The method of generating the blue noise dither mask pattern and its features are disclosed in U.S. Pat. No. 5,111,310, the Journal of Electronic Imaging (Jan. 1994, Vol. 3(1) pp. 92–97), and the J. Opt. Soc. Am.A (Vol. 9, No. 11, Nov. 1992, "Digital Halftoning Technique Using a Blue-Noise Mask"). Because this method is a known technique, its detailed description is omitted here.

In the above explanation concerning dithering, it is described that for the C, M and Y colors, the same mask patterns are used and for the K color a mask pattern with an inverted threshold value of the C, M and Y mask patterns is used. Because the object of this embodiment lies in making the overlaps between the dots of an achromatic color and the dots of chromatic colors almost equal, some conditions may be added to generation of the blue noise mask pattern to prevent the chromatic color dots and the achromatic color dots from overlapping at the low gradation level as practically as possible, or the blue noise masks may be generated individually for the four colors so that the frequencies at which the dots of three chromatic colors overlap the achromatic color dots are almost equal to each other.

The configuration other than the digitization method and its effects are similar to those of the first embodiment, so their detailed explanations are omitted.

[Third Embodiment]

In the preceding embodiments, when changing the printing duties of the chromatic colors progressively from one patch to another, the gradation level of Y is fixed while the gradation levels of C and M are changed two-dimensionally. This embodiment explains a case where a colorant of less lightness is fixed when changing the gradation levels.

According to the "Japan Color Reproduction Data," a result of investigation into colors (CIELab) on printed matters in Japan conducted by National Committee of ISO/TC130, an average lightness of a reflective text printed by C, M and Y inks as colorants is C=52.2, M=45.52 and Y=86.5. A printing paper generally is white (with the lightness estimated at around 90). Thus, the image printed with a Y ink of the highest lightness among these inks exhibits relatively small variations in the lightness as the printing duty changes. In contrast, a colorant M with the lowest lightness level exhibits relatively large variations in the lightness as the printing duty changes in the printed image.

On the other hand, it is known that the human visual perceptive function is more sensitive to a change in the lightness than to changes in saturation and in hue. Therefore, when picking a patch having a smallest color difference between the test area and the reference area from among a plurality of patches each having the test area and the reference area arranged adjacent to each other, in order to recognize a color difference quantitatively as it is, it is desired that the lightness of the test area remain unchanged as practically as possible. If the lightness of color as well as the color changes greatly, a disturbance owing to the change in lightness will make it difficult to identify a patch with a smallest color difference.

Therefore, in this embodiment, when a plurality of patches are formed by progressively changing the printing duty to generate a test pattern, the printing duties of the colorants C and Y are two-dimensionally changed while fixing the printing duty of the color M which has the lowest lightness among the three colorants C, M, Y and which exhibits a relatively large lightness change as the printing duty changes. This configuration of the test pattern further improves the accuracy of the color deviation detection.

A configuration except for the detection of the color deviation caused by the output characteristic difference among print heads is achieved in this embodiment, and its advantages are similar to those of the previous embodiments. Thus, their explanations are omitted.

While the first to third embodiments have dealt with a case where the print heads of bubble jet system, one type of ink jet system, are used, it should be noted that the application of the present invention is not limited to such print heads. Although in the preceding embodiments the color deviation has been described to be caused by the output characteristics differing among the print heads, it should of course be noted that the color deviation showing up in the printed result involves a variety of factors in the printing apparatus in which the print heads are mounted. In this specification, the output characteristic associated with these factors and appearing in the printed result are also included in the above-mentioned output characteristics of the print heads.

The present invention can also be applied to the printing performed by a printing apparatus which is not equipped with print heads, but uses toners as colorants.

Further, the preceding embodiments have described the test pattern print data as being generated by a host device and also the correction processing based on the information on the user-selected patch as being performed by the host device. Other configurations may also be adopted. For example, the above processing may be performed by the printer as the printing apparatus and at least the test pattern printing may be done by the printing apparatus separately.

[Other Embodiments]

The present invention may be applied to a system consisting of a plurality of devices (such as a host computer, an interface device, a reader and a printer) or to single device (such as a copying machine and a facsimile machine).

The present invention also includes a configuration in which a computer in an apparatus or system, which is connected with a variety of devices so as to realize functions of the foregoing examples shown in FIG. 6, is loaded with a program code of software and in which these devices are operated according to the program stored in the computer (CPU or MPU).

In this case, the software program code itself realizes the functions of these examples. The program code and a means for loading the program code to the computer, such as a storage medium containing the program code, constitute the present invention.

The storage media for storing the program code include floppy disk, hard disk, optical disk, magneto-optical disk, CD-ROM, magnetic tape, nonvolatile memory card and ROM.

The program code is included in the present invention not only when the functions of the aforementioned examples are realized by executing the program code loaded into the computer, but also when these functions are realized by the program code in cooperation with an OS (operating system) or application software running on the computer.

It is needless to say that the present invention further includes a configuration in which the program code is stored in a memory mounted on a computer's function extension board or a function extension unit connected to the computer and the CPU in the function extension board or unit executes a part or all of the actual processing according to the instructions of the program code to realize the functions of the preceding examples.

Apparent from the above description, according to the embodiments of the present invention, the test pattern, which is used to be checked for making the output characteristic for each of a plurality of colorants a predetermined one so as to correct color deviations, is printed. The test pattern comprises a plurality of patches, each of which has a test area and a reference area close together. The test area is printed with a mixture of a plurality of colorants and serves as an indicator for indicating a degree of the color deviation, and the reference area is printed with an achromatic color and serves as a reference to be compared with the test area. Among the plurality of patches, the mixing ratio of the colorants is changed from one patch to another. Then, spatial frequencies of the dots in the test area and in the reference area are set close to each other. Therefore, the visual perception characteristic for both areas when the user views the patch can be made almost equal. This in turn allows the user to perceive the actual color of the two areas more precisely, making it possible to compare with good accuracy the color of the test area with that of the reference area. As a result, the user can easily pick up a patch having the color of the test area closest to the color of the reference area.

As a result, in the processing of correcting the color deviation caused by output characteristic variations among print heads, the visual detection of the color deviation can be done with high precision.

The present invention has been described in detail with respect to various embodiments, and it will now be apparent from the foregoing to those skilled in the art that changes and modifications may be made without departing from the invention in its broader aspects, and it is the intention, therefore, that the appended claims cover all such changes and modifications as fall within the true spirit of the invention.

What is claimed is:

1. A test pattern printing method of printing a test pattern used in correction processing, the correction processing making an output characteristic for each of a plurality of colorants a predetermined output characteristic to correct a color deviation, said method comprising the step of:

printing a plurality of patches, each of which has a test area and a reference area adjacent to each other, the test area being printed with a mixture of the plurality of colorants and serving as an indicator for indicating a degree of the color deviation and the reference area being printed with a black colorant and a colorant other than the black colorant and serving as a reference to be compared with the test area, the plurality of patches being formed with dots of the plurality of colorants printed at different mixing ratios of the plurality of colorants, respectively, wherein the test area and the reference area are printed so that the spatial frequency of the dots in the test area and the spatial frequency of the dots in the reference area are close to each other.

2. A test pattern printing method as claimed in claim 1, wherein respective dot coverages of the test area and the reference area are 70% or more.

3. A test pattern printing method as claimed in claim 2, wherein the respective dot coverages of the test area and the reference area are 100%.

4. A test pattern printing method as claimed in claim 1, wherein the reference area is printed with the plurality of colorants used to print the test area and with the black colorant.

5. A test pattern printing method as claimed in claim 4, wherein respective colorants of the plurality of colorants for the test area and the reference area are used for printing at almost equal printing duties.

6. A test pattern printing method as claimed in claim 5, wherein the plurality of colorants are colorants of chromatic colors, respectively.

7. A test pattern printing method as claimed in claim 6, wherein the colorants of chromatic colors are colorants with respective hues of cyan, magenta and yellow.

8. A test pattern printing method as claimed in claim 1, wherein the plurality of patches are printed at different mixing ratios of the plurality of colorants while fixing the mixing ratio for the colorant having the lowest lightness.

9. An information processing apparatus for performing a process for printing a test pattern used in correction processing, the correction processing making an output characteristic for each of a plurality of colorants a predetermined output characteristic to correct a color deviation in printing by a printing apparatus, said information processing apparatus comprising:

means for supplying printing data to cause the printing apparatus to print a plurality of patches, each of which has a test area and a reference area adjacent to each other, the test area being printed with a mixture of the plurality of colorants and serving as an indicator for indicating a degree of the color deviation and the reference area being printed with a black colorant and a colorant other than the black colorant and serving as a reference to be compared with the test area, the plurality of patches being formed with dots of the plurality of colorants printed at different mixing ratios of the plurality of colorants, respectively, wherein the test area and the reference area are printed so that the spatial frequency of the dots in the test area and the spatial frequency of the dots in the reference area are close to each other.

10. An information processing apparatus as claimed in claim 9, further comprising means for making the output characteristic for each of the plurality of colorants to the predetermined output characteristic to correct the color deviation, based on selection information on the plurality of patches.

11. An information processing apparatus as claimed in claim 10, wherein respective dot coverages of the test area and the reference area are 70% or more.

12. An information processing apparatus as claimed in claim 11, wherein the respective dot coverages of the test area and the reference area are both 100%.

13. An information processing apparatus as claimed in claim 10, wherein the reference area is printed with the plurality of colorants used to print the test area and with the black colorant.

14. An information processing apparatus as claimed in claim 13, wherein respective colorants of the plurality of colorants for the test area and the reference area are used for printing at almost equal printing duties.

15. An information processing apparatus as claimed in claim 14, wherein the plurality of colorants are colorants of chromatic colors, respectively.

16. An information processing apparatus as claimed in claim 15, wherein the colorants of chromatic colors are colorants with respective hues of cyan, magenta and yellow.

17. An information processing apparatus as claimed in claim 10, wherein the plurality of patches are printed at different mixing ratios of the plurality of colorants while fixing the mixing ratio for the colorant having the lowest lightness.

18. A printing apparatus capable of printing a test pattern used in correction processing, the correction processing making an output characteristic for each of a plurality of colorants a predetermined output characteristic to correct a color deviation, said apparatus comprising:

means for printing a plurality of patches, each of which has a test area and a reference area adjacent to each other, the test area being printed with a mixture of the plurality of colorants and serving as an indicator for indicating a degree of the color deviation and the reference area being printed with a black colorant and a colorant other than the black colorant and serving as a reference to be compared with the test area, the plurality of patches being formed with dots of the plurality of colorants printed at different mixing ratios of the plurality of colorants, respectively, wherein the test area and the reference area are printed so that the spatial frequency of the dots in the test area and the spatial frequency of the dots in the reference area are close to each other.

19. A printing apparatus as claimed in claim 18, wherein respective dot coverages of the test area and the reference area are 70% or more.

20. A printing apparatus as claimed in claim 19, wherein the respective dot coverages of the test area and the reference area are 100%.

21. A printing apparatus as claimed in claim 18, wherein the reference area is printed with the plurality of colorants used to print the test area and with the black colorant.

22. A printing apparatus as claimed in claim 21, wherein respective colorants of the plurality of colorants for the test area and the reference area are used for printing at almost equal printing duties.

23. A printing apparatus as claimed in claim 22, wherein the plurality of colorants are colorants of chromatic colors, respectively.

24. A printing apparatus as claimed in claim 23, wherein the colorants of chromatic colors are colorants with respective hues of cyan, magenta and yellow.

25. A printing apparatus as claimed in claim 18, wherein the plurality of patches are printed at different mixing ratios of the plurality of colorants while fixing the mixing ratio for the colorant having the lowest lightness.

26. A printing apparatus as claimed in claim 24, wherein a plurality of print heads for the plurality of colorants are used for printing.

27. A printing apparatus as claimed in claim 26, wherein the print heads eject ink to form the dots.

28. A printing apparatus as claimed in claim 27, wherein the print heads use thermal energy to generate a bubble in ink and eject ink by a pressure of the bubble.

29. A storage medium storing a program readable by an information processing apparatus, a processing of the program being a test pattern printing processing for printing a test pattern used in correction processing, the correction processing making an output characteristic for each of a plurality of colorants a predetermined output characteristic to correct a color deviation, said processing comprising the step of:

printing a plurality of patches, each of which has a test area and a reference area adjacent to each other, the test area being printed with a mixture of the plurality of colorants and serving as an indicator for indicating a degree of the color deviation and the reference area being printed with a black colorant and a colorant other than the black colorant and serving as a reference to be compared with the test area, the plurality of patches being formed with dots of the plurality of colorants printed at different mixing ratios of the plurality of colorants, respectively, wherein the test area and the reference area are printed so that the spatial frequency of the dots in the test area and the spatial frequency of the dots in the reference area are close to each other.

30. A program for causing an information processing apparatus to execute a test pattern printing processing for printing a test pattern used in correction processing, the correction processing making an output characteristic for each of a plurality of colorants a predetermined output characteristic to correct a color deviation, said test pattern printing processing comprising the step of:

printing a plurality of patches, each of which has a test area and a reference area adjacent to each other, the test area being printed with a mixture of the plurality of colorants and serving as an indicator for indicating a degree of the color deviation and the reference area being printed with a black colorant and a colorant other than the black colorant and serving as a reference to be compared with the test area, the plurality of patches being formed with dots of the plurality of colorants printed at different mixing ratios of the plurality of colorants, respectively, wherein the test area and the reference area are printed so that the spatial frequency of the dots in the test area and the spatial frequency of the dots in the reference area are close to each other.

* * * * *

UNITED STATES PATENT AND TRADEMARK OFFICE
CERTIFICATE OF CORRECTION

PATENT NO. : 6,474,768 B1
DATED : November 5, 2002
INVENTOR(S) : Yano et al.

It is certified that error appears in the above-identified patent and that said Letters Patent is hereby corrected as shown below:

Column 2,
Line 9, "as" should be deleted.

Column 4,
Line 22, "is" should read -- be --.

Column 8,
Line 56, "processing" should read -- processings --.

Column 9,
Line 56, "above described" should read -- above-described --.

Column 17,
Insert text from left column of following page of patent.

Column 18,
Insert text from right column of following page of patent.

Signed and Sealed this

Second Day of September, 2003

JAMES E. ROGAN
*Director of the United States Patent and Trademark Office*